UNITED STATES PATENT OFFICE.

LEO WALLERSTEIN, OF NEW YORK, N. Y.

PREPARATION CONTAINING LUPULIN AND METHOD OF MAKING SAME.

995,822.  Specification of Letters Patent.  Patented June 20, 1911.

No Drawing.  Application filed August 2, 1910.  Serial No. 575,134.

*To all whom it may concern:*

Be it known that I, LEO WALLERSTEIN, a subject of the Emperor of Germany, residing at New York, in the county of New York and State of New York, have invented certain new and useful Improvements in Preparations Containing Lupulin and Methods of Making the Same, of which the following is a specification.

This invention relates to methods of treating lupulin or so-called hop-flour for rendering the same more available for use in the art of brewing, and to a preparation containing a lupulin product which is capable of yielding with water clear or opalescent solutions or pseudo-solutions having a yellowish color.

It is well known that hop-flour or lupulin as commonly employed for imparting a bitter taste and pleasant aroma to beer is practically insoluble in water or in weak alcoholic solutions, although capable of imparting thereto a characteristic taste and aroma. For such uses lupulin is usually added to the wort in the kettle and when used is invariably boiled with the wort; for if added to cold beer it merely floats upon the surface and is practically wasted.

According to the present invention lupulin is so treated or modified as to render it soluble in water or weak alcoholic solutions. This result is preferably secured by a prolonged grinding, milling or pulverizing operation, the lupulin being preliminarily mixed with an adequate proportion of cane-sugar or other suitable material or diluent.

I may proceed as follows: The commercial lupulin is mixed with a suitable excess of pulverized cane-sugar, and the mixture charged into a porcelain ball-mill and subjected therein to prolonged grinding. Continuous grinding for about one week gives satisfactory results. For the best results excessive temperatures should be avoided, and it is preferred to cool the mixture, particularly in hot weather. Suitable proportions for the mixture to be ground are two to ten parts by weight of commercial lupulin to ninety-eight to ninety parts of cane-sugar, the larger proportions of lupulin being preferred in order to reduce the quantity of mixture to be treated. Proportions of lupulin greatly exceeding ten per cent. by weight of the mixture cannot be satisfactorily treated by this method, as a sufficient degree of subdivision to yield the results desired is not obtainable.

At the end of the milling operation the material will be found to consist of a pulverulent mass in a state of extreme subdivision and to be capable of yielding yellow solutions or pseudo solutions, even with cold water such solutions being usually somewhat opalescent. The powder from the mill may be intimately mixed with further proportions of cane-sugar to reduce the proportion of lupulin to the desired standard, conveniently about two to five per cent. lupulin, and is then ready for use. In use it is preferred to dissolve the preparation in water, beer or in alcohol of any desired dilution; the solution is then separated by decantation or filtration from any solid matter or impurities and is added to the beer, usually in the chip cask. Suitable proportions are the equivalent of one to ten grams of lupulin per barrel of beer. The addition may be made at any convenient period after the boiling of the wort.

It is certain that changes of an essentially chemical nature occur during the milling above described, but the precise character of these changes cannot as yet be stated with certainty. It appears probable however that there is a concurrent resinification and polymerization of the essential or ethereal oils contained in the commercial lupulin with perhaps some modification of the resins. The sugar appears to absorb the oil matters of the lupulin as well as to coat the resinous matters in such manner as to permit indefinite subdivision without caking.

The presumption that the lupulin undergoes chemical modifications during the grinding is based not only upon the altered character of the final product, as above described, but upon the observation that whereas the mass, in the early stages of the grinding operation, is plastic in character, it becomes progressively stiffer as the grinding proceeds and ultimately becomes dry and pulverulent.

Under some conditions wet or paste mixing or grinding with water, alcoholic solutions or other liquids not incompatible with the uses of the product may be preferred.

The product used even in the small proportions above indicated is found to improve the beer and to impart a pleasant and characteristic bitter taste thereto.

The term "beer" is intended to include similar products, such as ales.

I claim:

1. A new composition of matter containing lupulin in a state of minute subdivision and capable of yielding with water clear or opalescent solutions or pseudo solutions of a yellowish color.

2. A new composition of matter containing lupulin in a state of minute subdivision and capable of yielding with water clear or opalescent solutions or pseudo solutions of a yellowish color, and a sugar.

3. A new composition of matter containing lupulin in a state of minute subdivision and capable of yielding with water clear or opalescent solutions or pseudo solutions of a yellowish color, and cane sugar.

4. The method of treating lupulin, which consists in grinding the same, mixed with a sugar, until the lupulin acquires the property of yielding with water clear or opalescent solutions or pseudo solutions of a yellowish color.

In testimony whereof, I affix my signature in presence of two witnesses.

LEO WALLERSTEIN.

Witnesses:
JOHN KEIM, Jr.,
M. M. RAPPOPORT.